United States Patent
Bezjak et al.

(10) Patent No.: US 12,392,397 B2
(45) Date of Patent: Aug. 19, 2025

(54) TOOTHED BELT AXIS WITH A CLAMPING APPARATUS

(71) Applicant: Festo SE & Co. KG, Esslingen (DE)

(72) Inventors: Erwin Bezjak, Ostfildern (DE); Rainer Konermann, Nürtingen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/812,612

(22) Filed: Aug. 22, 2024

(65) Prior Publication Data
US 2025/0067324 A1 Feb. 27, 2025

(30) Foreign Application Priority Data
Aug. 23, 2023 (DE) ...................... 10 2023 122 569.3

(51) Int. Cl.
*F16H 19/06* (2006.01)
(52) U.S. Cl.
CPC ..... *F16H 19/06* (2013.01); *F16H 2019/0613* (2013.01)
(58) Field of Classification Search
CPC ............ F16H 19/06; F16H 2019/0613; F16H 2019/0686; F16H 2019/0668
See application file for complete search history.

(56) References Cited

U.S. PATENT DOCUMENTS

| | | | | |
|---|---|---|---|---|
| 7,810,219 B2 * | 10/2010 | Lindemann | ............... | F16G 3/08 24/37 |
| 8,578,653 B2 * | 11/2013 | Hawkins | ............... | E05F 15/681 49/197 |
| 10,883,578 B2 * | 1/2021 | Rosengren | .......... | F16H 25/2015 |

FOREIGN PATENT DOCUMENTS

| | | |
|---|---|---|
| EP | 2 110 579 B1 | 10/2009 |
| JP | 3217261 B2 * | 10/2001 ............ F15B 15/084 |

OTHER PUBLICATIONS

JP-3217261-B2 Machine Translation (Year: 2001).*
Office Action issued in corresponding German Patent Application No. 10 2023 122 569.3, Mar. 13, 2024, 4 pages.

* cited by examiner

*Primary Examiner* — Jake Cook
(74) *Attorney, Agent, or Firm* — HSML P.C.

(57) ABSTRACT

A toothed belt axis with a toothed belt, a toothed belt disk, a deflector, a profile body extending along a motion axis, a slide and a clamping apparatus. The slide includes a first front surface, into which first front surface a first reception opening extending along the motion axis for receiving the clamping apparatus is inserted. The profile body is configured for linearly movable guidance of the slide, the toothed belt can be driven by means of the toothed belt disk and can be deflected by means of the deflector, the slide being movable in the profile body by means of the toothed belt. The clamping apparatus includes a clamping body, a pressure plate, an annularly configured support body and a pressure member, the clamping body having a front side a back side, a reception room configured as a slot and a support portion.

12 Claims, 6 Drawing Sheets

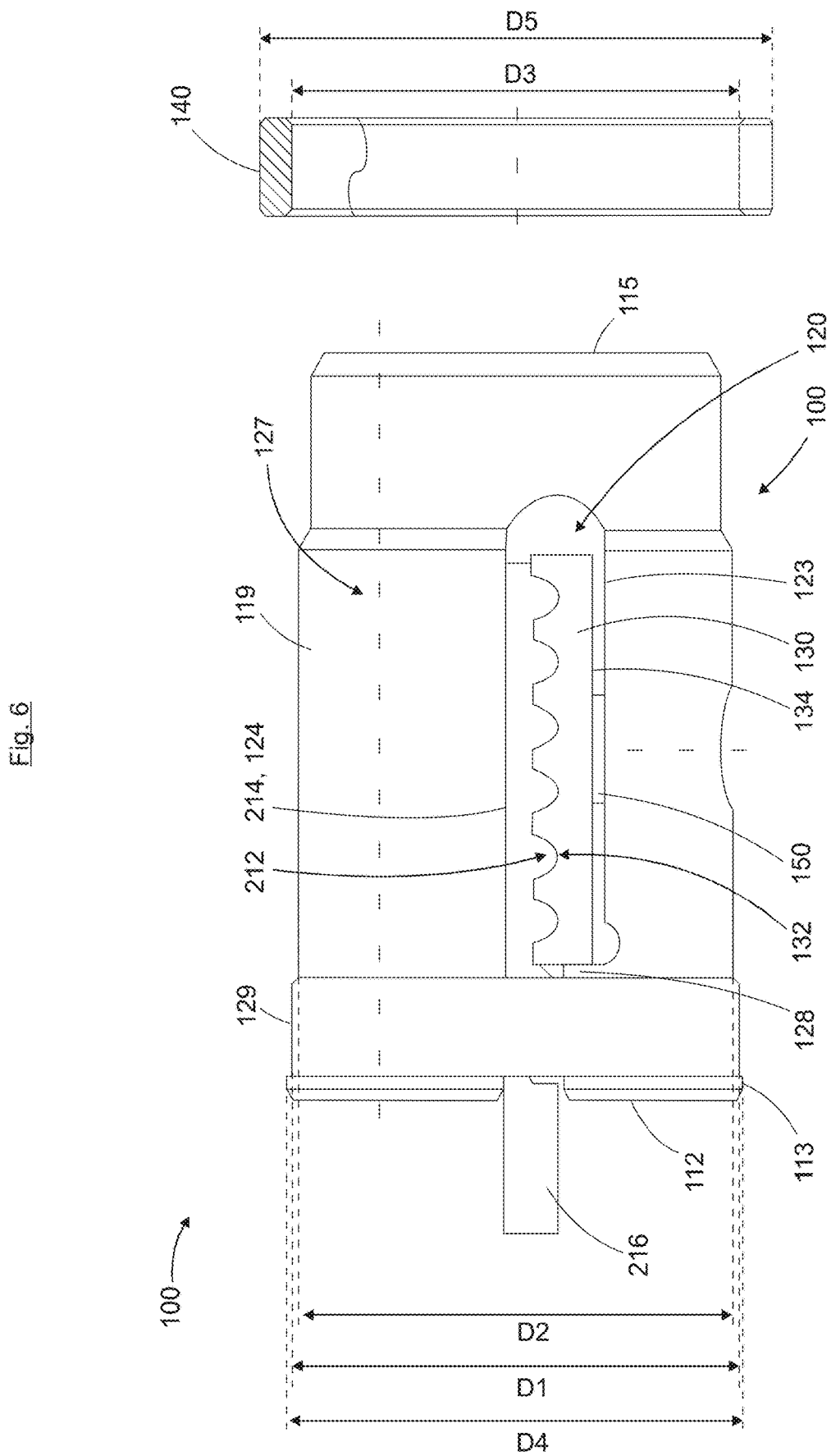

TOOTHED BELT AXIS WITH A CLAMPING APPARATUS

BACKGROUND OF THE INVENTION

The invention relates to a toothed belt axis with a clamping apparatus.

For toothed belt axes, which are known from the prior art, a force-transmitting connection between an end portion of a toothed belt and a slide by means of a clamping apparatus is known. The clamping apparatus can be used to transmit the tensile forces applied to the toothed belt by a drive unit to the slide, which is accommodated in a profile body for linear movement. A known clamping apparatus comprises a clamping body which is provided with a slot for receiving the end portion of the toothed belt, wherein the toothed belt can be received in the slot in a force-fit and/or form-fit manner. Furthermore, a connecting member is provided to attach the clamping body to the slide.

SUMMARY OF THE INVENTION

The object of the present invention is to provide a toothed belt axis which is easy to handle and inexpensive to manufacture.

The object is solved by a toothed belt axis with the features listed below:

The toothed belt axis according to the invention comprises a toothed belt, a toothed belt disk, a deflector, a profile body extending along a motion axis, a slide and a clamping apparatus, wherein the slide comprises a first front surface, into which first front surface a first reception opening extending along the motion axis for receiving the clamping apparatus is inserted, wherein the profile body is configured for linearly movable guidance of the slide, wherein the toothed belt can be driven by means of the toothed belt disk and can be deflected by means of the deflector, the slide being movable in the profile body by means of the toothed belt, the clamping apparatus comprising a clamping body, a pressure plate, an annularly configured support body and a pressure member, the clamping body having a front side a back side, a reception room configured as a slot and a support portion, wherein the reception room extends from the front side along the motion axis and passes through the clamping body transversely to the motion axis, wherein the reception room comprises a first inner surface and a second inner surface opposite the first inner surface, wherein the pressure plate comprises a pressure plate upper side with toothing and a pressure plate lower side, wherein the toothed belt comprises a toothed belt inner side with toothing, a toothed belt outer side and at least one end portion, wherein the pressure plate and the end portion are received in the reception room in such a way that the toothed belt outer side faces the second inner surface, the pressure plate lower side faces the first inner surface and the toothed belt inner side faces the pressure plate upper side, wherein the toothing of the pressure plate upper side is configured complementary to the toothing of the toothed belt inner side, wherein the pressure plate is pressed against the toothed belt by the pressure member resting on the pressure plate lower side in order to press the toothed belt outer side against the second inner surface, wherein the support body surrounds the support portion in order to prevent the reception room from widening, in particular induced by the pressure member.

A widening of the clamping body can lead to the toothed belt slipping out of the reception room, which would compromise the operational safety of the toothed belt axis. Furthermore, a widening of the clamping body could lead to the clamping apparatus jamming in the reception opening, so that easy removal of the clamping apparatus from the slide would be compromised and damage to the slide and/or the clamping apparatus could occur.

The widening of the reception room occurs as an increase in the distance between the first inner surface and the second inner surface and is prevented according to the invention by the fact that a force flow introduced into the clamping body by the pressure member and the pressure plate is diverted from the support ring by means of the support ring, so that this force flow does not cause deformation of the clamping body.

By providing the first reception opening, the clamping apparatus can be inserted at least partially into the slide, thereby reducing the required installation space. In addition, the clamping apparatus can be inserted into the first reception opening to such an extent that the support ring, starting from a functional position in which it surrounds the support portion, does not run the risk of slipping off the support portion, which would compromise the function of the support ring. The front side is the side of the clamping body that faces away from the slide during operation and via which the toothed belt can be inserted into the reception room. The back side is the side of the clamping body that faces to the slide during operation, i.e., the side that enters the first reception opening first when the clamping apparatus is inserted into it. The toothed belt inner side is the side of the toothed belt that is in contact with the toothed belt disk during operation. The toothed belt outer side is the side of the toothed belt that faces away from the toothed belt disk during operation. By pressing the pressure plate against the toothed belt, the positive fit between the toothed belt and the clamping body is reinforced, which reduces the risk of the toothed belt slipping out.

The support body can preferably be moved into the functional position by sliding it on, but also by screwing or pressing it on. A clearance fit is preferably provided between the outer contour of the clamping apparatus and the inner contour of the first reception opening. The length of the support ring extending along the motion axis and/or a thickness of the support ring can be selected depending on the expected load on it. For example, a short support ring with a small thickness can be provided for low loads and a long support ring with a large thickness for high loads.

Preferably, the pressure member is configured as a screw, in particular as a space-saving grub screw, and the clamping body comprises a thread for screwing in the screw. The thread extends transversely to the motion axis from an outer circumferential surface of the clamping body, which is configured in particular as a circular cylinder, into the reception room.

Preferably, the deflector is configured as a deflection roller or toothed belt disk.

Preferably, the support body is configured in the shape of a circular ring. This means that the support body can be mounted on the support portion in any direction of rotation.

Preferably, the support portion is configured to be at least partially annular, in particular at least partially circular.

Preferably, the first inner surface and the second inner surface are aligned parallel to each other.

Preferably, a first stop projects outwards in the radial direction from the outer circumferential surface, which first stop is positioned between the front side and the support portion. The first stop comprises an outer diameter that is larger than the inner diameter of the support body, at least in some areas. This can prevent the support body from slipping off the support portion in the direction of the front side. Furthermore, the clamping body is configured in such a way that the support body can be moved along the motion axis via the back side to the support portion.

Preferably, a second stop projects from the first inner surface in the direction of the second inner surface, the second stop in particular being adjacent to the front side. The second stop is configured in such a way that, when the toothed belt and the pressure plate are received in the reception room, the pressure plate is prevented from slipping out in the axial direction along the motion axis.

Preferably, the toothed belt axis comprises a tensioning screw, wherein the clamping body further comprises a through bore extending from the front side to the back side for receiving the tensioning screw and the slide further comprises a tensioning thread which extends from the first reception opening along the motion axis, wherein the tensioning screw can be screwed into the tensioning thread in order to adjust the tension of the toothed belt. Furthermore, the toothed belt tension can be kept within the required range during operation when carrying out maintenance work on the toothed belt axis by actuating the tensioning screw. Preferably, the tensioning screw and the tensioning thread are configured in such a way that screwing the tensioning screw into the tensioning thread increases the toothed belt tension and unscrewing the tensioning screw from the tensioning thread reduces the toothed belt tension.

Preferably, the through bore comprises a counterbore, in particular a circular cylindrical counterbore, into which the head of the tensioning screw can be accommodated, thus avoiding that elements protrude from the front side which pose a risk of injury and/or damage.

Preferably, the first reception opening comprises a guiding contour and the clamping body comprises a guiding area which is complementary to the guiding contour. As an example, the reception opening comprises a non-circular profiling in a cross-sectional plane aligned transversely to the motion axis and the clamping body comprises a corresponding profiling at least in sections. This provides a predetermined spatial orientation between the slide and clamping body and, as a result, an anti-rotation apparatus for the toothed belt held on the clamping body. The corresponding profiles can be configured as flat surfaces, for example.

Preferably, the clamping body is made of a light metal, in particular of aluminum. Thus, the mass moved during operation can be reduced, which can lower the energy requirement.

In addition, manufacturing costs can be reduced in this way. Any loss of strength associated with the use of light metal, in particular aluminum, compared to the use of stainless steel can be compensated for by the support body, which is used to absorb the loads described above.

Alternatively, the clamping body can be made of a plastic, wherein the aforementioned with regard to light metals applies analogously.

Preferably, the support portion comprises a larger outer diameter than the remaining outer circumferential surface. Thus, the application of the support body to the support portion can be facilitated, which can increase the ease of handling. In addition, it can be prevented in this way that, in addition to a fit provided in relation to the support portion, such a fit must also be provided in relation to the outer circumferential surface extending up to the support portion, which can reduce the manufacturing costs.

Preferably, the outer diameter of the support portion and the inner diameter of the support body have the same size. This can further prevent the reception room from widening, which can increase operational safety. A fit is also preferably provided between the support portion and the support body. This fit is even more preferably a transition fit in order to enable low-resistance sliding and at the same time minimize the clearance between the support body and the support portion.

Preferably, the clamping body is configured to be rotationally symmetrical at least in certain sections. Thus, cost-effective manufacturing processes can be used, e.g. turning processes, which can reduce production costs.

Preferably, the toothed belt axis further comprises a further clamping apparatus, wherein the slide further comprises a further front surface into which further front surface a second reception opening positioned opposite the first reception opening is inserted for receiving the further clamping apparatus, wherein the toothed belt comprises a further end portion which further end portion is received in the reception room of the further clamping apparatus.

The toothed belt can be clamped and preferably tensioned as follows: first, an end portion of the toothed belt is inserted into the reception room of a clamping body. The corresponding pressure plate is then inserted into the reception room, preferably via the openings of the slot on the outer circumferential surface. Alternatively, the pressure plate can be inserted into the reception room first and then the end portion of the toothed belt.

The support body is then placed on the support portion. The pressure plate is then pressed against the toothed belt with the pressure member resting on the pressure plate lower side, whereby the toothed belt outer side is pressed against the second inner surface. The clamping apparatus is then positioned in a reception opening, i.e. inserted into it and fastened in it, preferably by means of the tensioning screw. Finally, the tension of the toothed belt can be adjusted by screwing the tensioning screw into or out of the tensioning thread.

BRIEF DESCRIPTION OF THE DRAWINGS

An advantageous embodiment of the invention is shown in the drawings. It shows.

DETAILED DESCRIPTION

Figure 1:
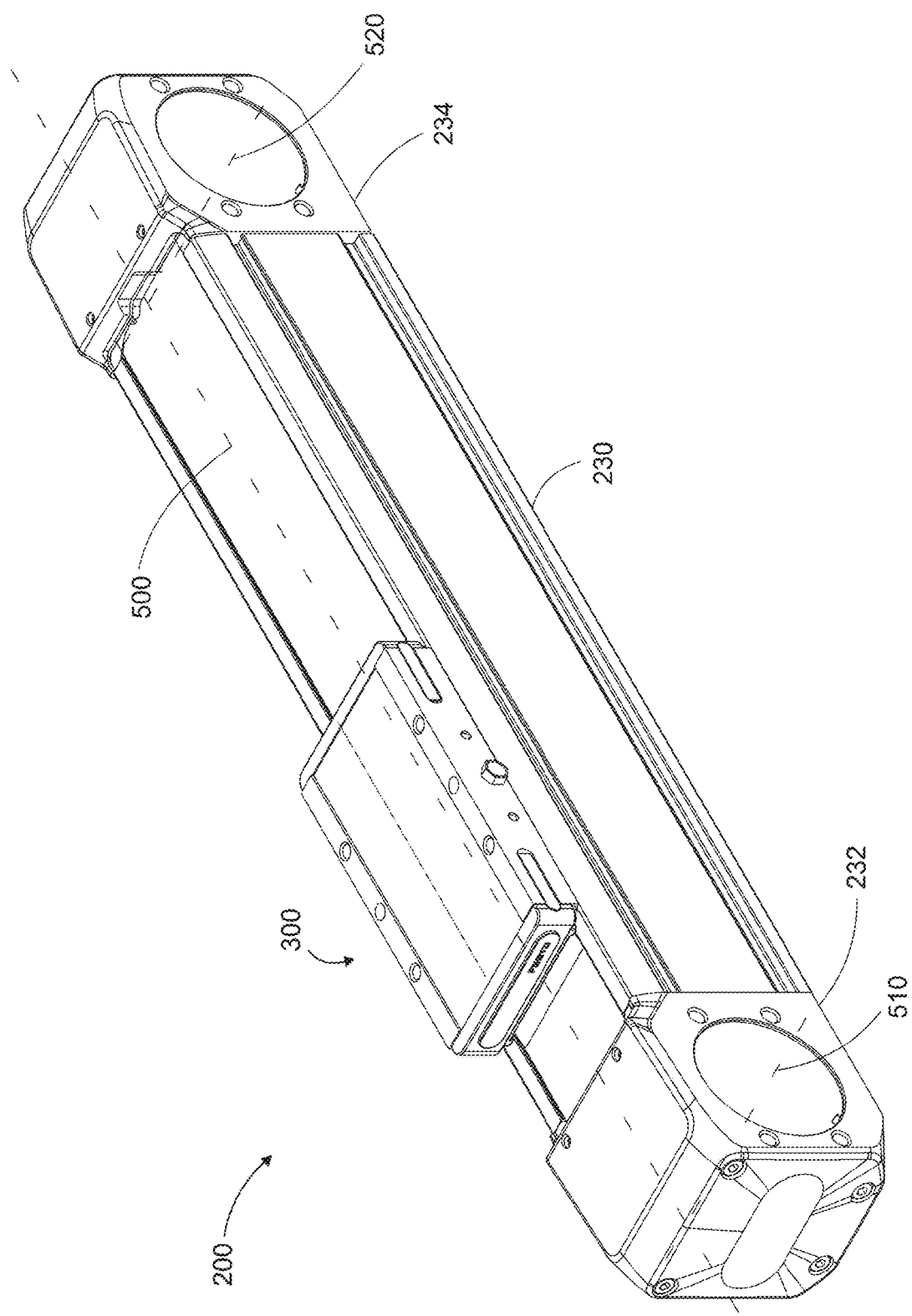
FIG. 1 a toothed belt axis according to the invention.

FIG. 1 shows a toothed belt axis 200 according to the invention with a slide 300 and a profile body 230. The profile body 230 is aligned along a motion axis 500 and is configured to guide the slide 300 linearly along this motion axis 500. The slide 300 is driven by means of a toothed belt 210 (see FIG. 3). The toothed belt 210 is driven via a toothed belt disk 220 (see FIG. 3), which is accommodated in a deflection housing 232 attached to the end of the profile body 230. The toothed belt disk 220 is connected to a motor flange 250 (see FIG. 3), on which, for example, an electric motor can be provided to drive the toothed belt disk 220. The toothed belt disk 220 rotates about a first axis of rotation 510. On the side of the profile body 230 opposite the toothed belt disk 220, a deflector 240 (cf. FIG. 3) is provided in a further deflector housing 234 attached to the end of the profile body 230, with which the toothed belt 210 is deflected. The deflector 240 rotates about a second axis of rotation 520. The profile body 230 shown in FIG. 1 preferably comprises a cover in order to protect the toothed belt 210 from soiling and damage.

Figure 2:
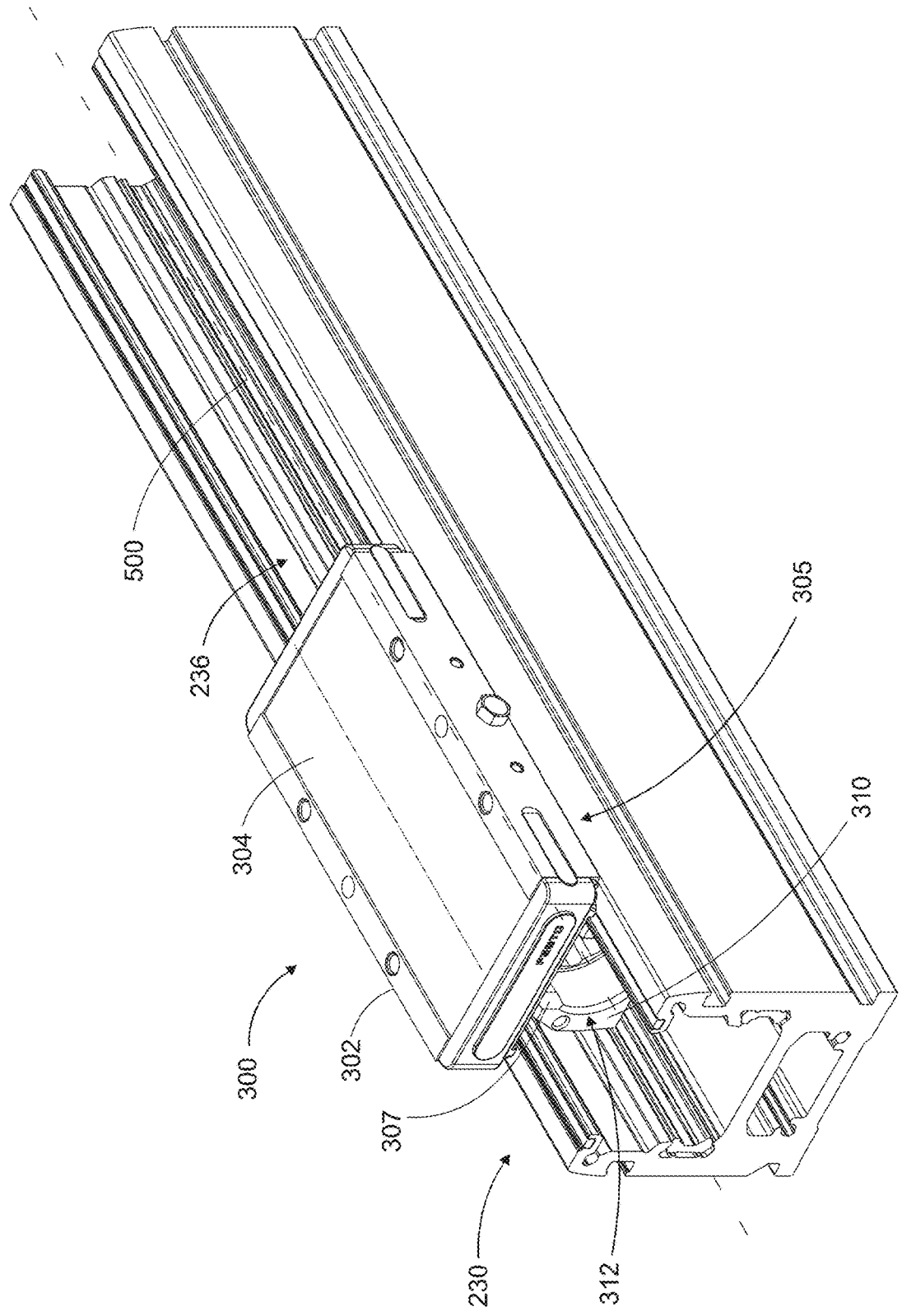
FIG. 2 a profile body and a slide of the toothed belt axis shown in FIG. 1, FIG. 3 an abstract sectional view of a toothed belt axis according to the invention, FIG. 4 the slide shown in FIG. 2 and a clamping apparatus of the toothed belt axis shown in FIG. 1 in an perspective exploded view, FIG. 5 an abstract representation of a clamping apparatus with a support body surrounding a support portion, FIG. 6 the clamping apparatus shown in FIG. 5 with a support body positioned next to a clamping body.

FIG. 2 shows the profile body 230 and the slide 300 of the toothed belt axis 200 shown in FIG. 1. The profile body 230 is preferably configured with a constant profiling along the motion axis 500, in particular as an extruded aluminum profile.

The slide 300 comprises a cuboid carrier body 302, the upper side 304 of which can be used to hold a workpiece or workpiece carrier. Starting from an underside 305 facing away from the upper side 304, a coupling body 307 extends, with which the slide 300 projects into a recess 236 defined by the profile body 230. Below the upper edge of the profile body 230, which is located at the top in the embodiment, a first reception opening 312 extending along the motion axis 500 is provided on the coupling body 307 in a first front surface 310 of the coupling body 307, which is aligned purely by way of example in the axial direction. This first reception opening 312 serves to receive a clamping apparatus 100, as will be described in more detail below.

Figure 3:
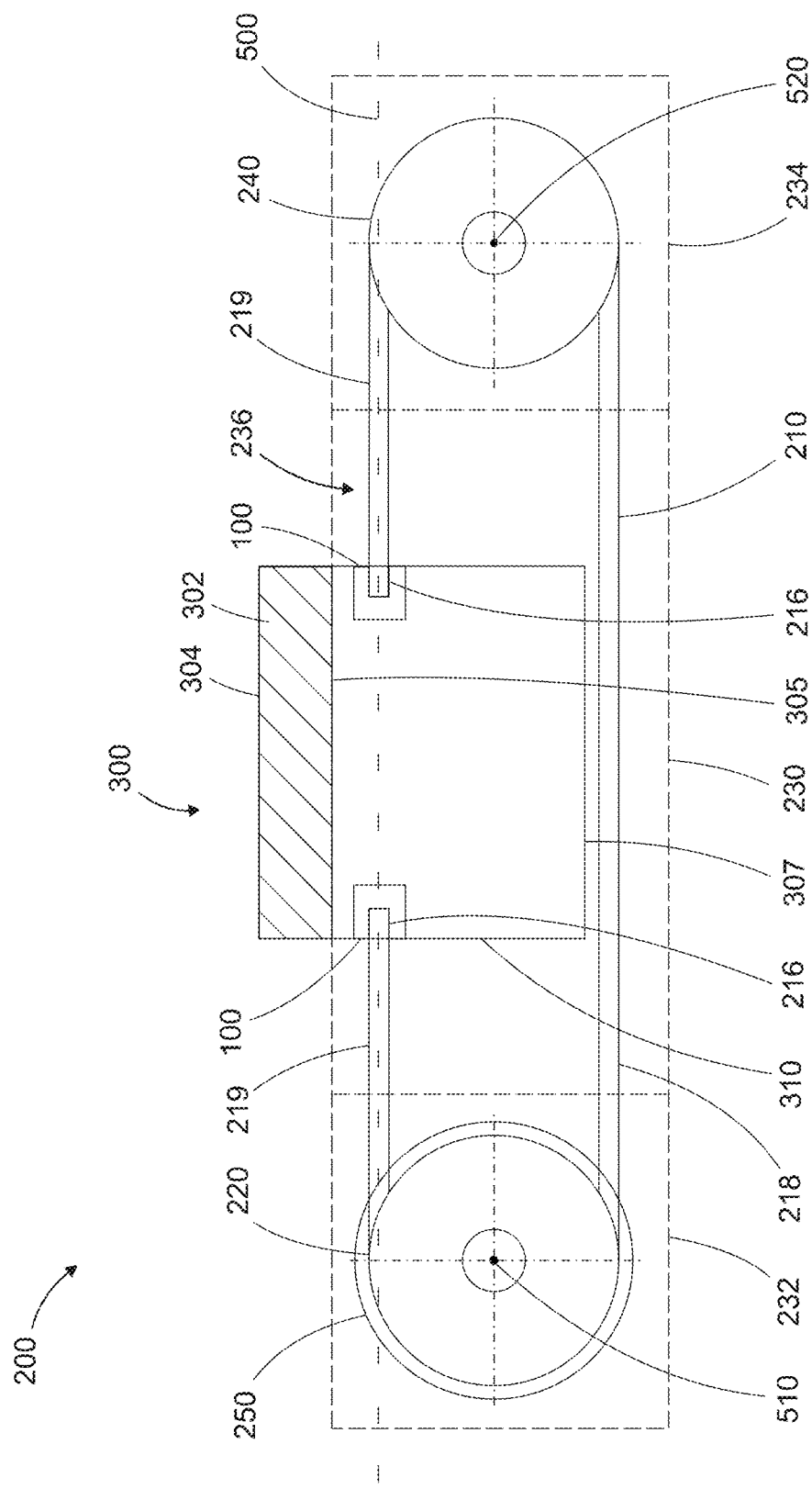

FIG. 3 shows an abstract sectional view of a toothed belt axis 200 according to the invention. Based on the representations of FIGS. 1 and 2, it can be seen in FIG. 3 that the slide 300 with the carrier body 302 is arranged at least in some areas outside the profile body 230, which is only shown in dashed lines, while the coupling body 307 is accommodated in the recess 236 of the profile body 230. The toothed belt disk 220 and the deflector 240, which can also be configured as a toothed belt disk, are each mounted for rotational movement about the first or second axis of rotation 510, 520 in the respective deflector housings 232, 234 attached to the end of the profile body 230.

The toothed belt disk 220 and the deflector 240 are each wrapped around in regions by a toothed belt 210, which extends from a first clamping apparatus 100 to a further clamping apparatus 100. For the following description, it is assumed that the first clamping apparatus 100 and the further clamping apparatus 100 are configured identically, so that a separate description of the further clamping apparatus 100 is unnecessary.

The two clamping apparatuses 100 are each inserted in opposite reception openings (cf. FIGS. 2 and 4) of the coupling body 307.

The toothed belt 210 comprises two end portions 216, of which one end portion 216 is clamped in each of the two clamping apparatuses 100. The toothed belt 210 shown in FIG. 3 comprises a lower run 218 in the lower region, which is located between the toothed belt disk 220 and the deflector 240, and two upper runs 219 in the upper region, which are located on the one hand between the toothed belt disk 220 and the left clamping apparatus 100 and on the other hand between the deflector 240 and the right clamping apparatus 100. The two upper runs 219 and the lower run 218 are aligned along the motion axis 500.

The slide 300 can be moved to the right along the motion axis 500 by means of the toothed belt 210. For this purpose, the toothed belt disk 220 is driven in a clockwise direction. In addition, the slide 300 can be moved to the left along the motion axis 500 by means of the toothed belt 210, for which purpose the toothed belt disk 220 is driven counterclockwise.

Figure 4:
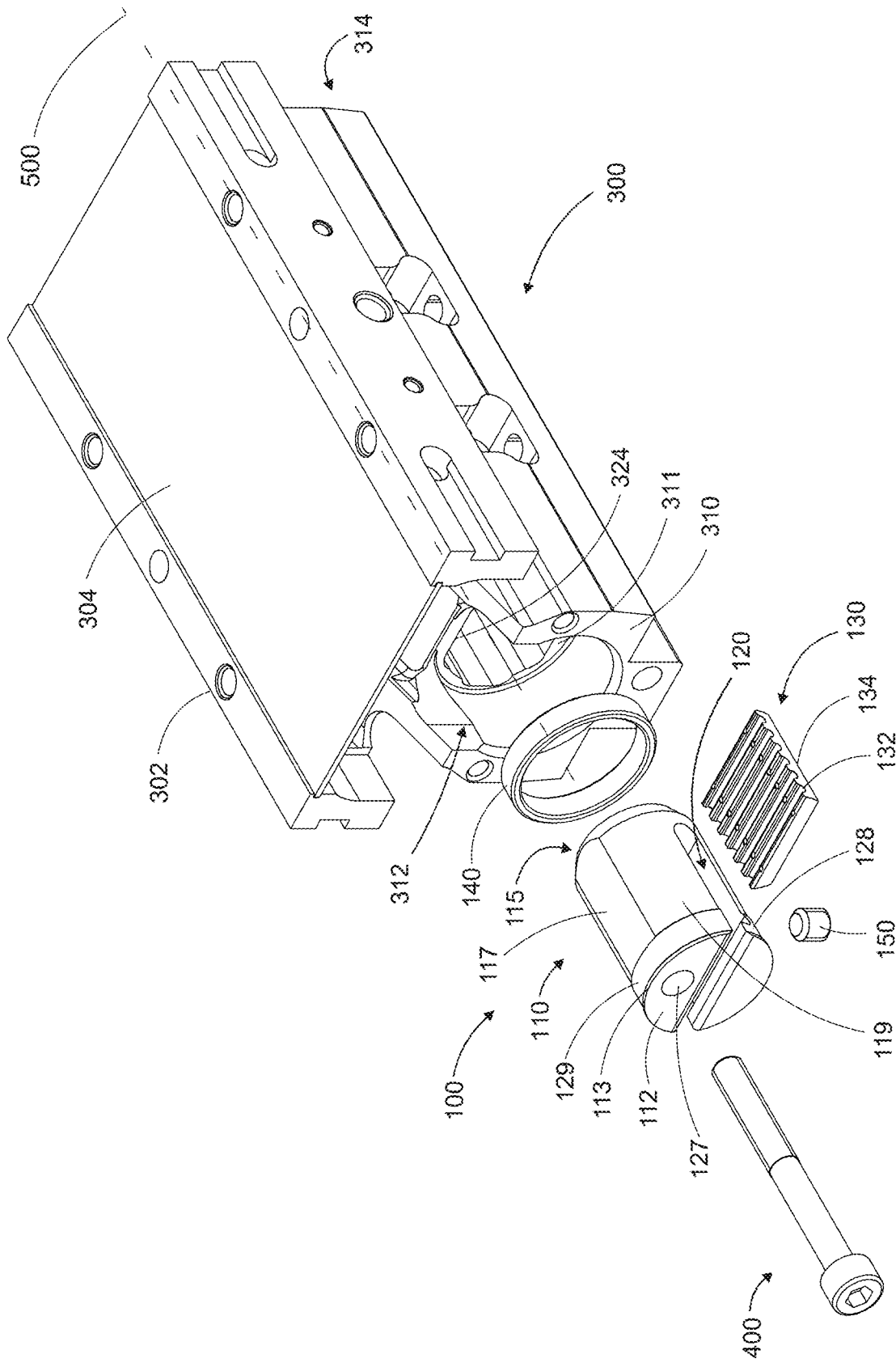

FIG. 4 shows the slide 300 shown in FIG. 2 and the clamping apparatus 100 of the toothed belt axis 200 shown in FIG. 1 in an perspective exploded view.

A first reception opening 312 extending along the motion axis 500 is formed in the first front surface 310. The first reception opening 312 comprises along the motion axis 500, starting from the first front surface 310, successively a first, circular and upwardly open section, a second front surface 311 and a second section comprising a guiding contour 324. The first section comprises a larger inner diameter than the second section. In addition, the inner diameter of the first section is larger than an outer diameter D5 of the support body 140 (see FIG. 6), so that the support body 140 can be accommodated in the first section. Furthermore, the outer diameter D5 of the support body 140 is larger than the inner diameter of the second section, so that the support body 140 can be supported on the second front surface 311 without penetrating into the second section. This support only occurs if the support body 140 should slip off the clamping body 110, described in more detail below, in an undesirable manner.

In addition, the slide 300 comprises a further front surface aligned purely by way of example in the opposite direction to the first front surface 310 and a second reception opening 314 (concealed in FIG. 4) formed in this further front surface. For the following description, it is assumed that the first reception opening 312 and the second reception opening 314 are configured identically, so that a separate description of the second reception opening 314 is unnecessary.

The clamping apparatus 100 comprises a substantially rotationally symmetrical clamping body 110 with a circular cylindrical outer circumferential surface 119. In addition, the clamping body 110 comprises a front side 112, a back side 115, a reception room 120 extending from the front side 112, configured as a slot and extending transversely to an axis of rotational symmetry, which in the case of FIG. 4 is aligned coaxially with the motion axis 500, and a support portion 129 configured as a circular cylinder.

The clamping apparatus 100 further comprises a pressure plate 130, a circularly configured support body 140 and a pressure member 150. In the operating state, the support body 140 surrounds the support portion 129 and is thus in a functional position (see FIG. 5).

The reception room 120 extends from the front side 112 along the motion axis 500 and passes through the clamping body 110 perpendicular to the motion axis 500. The reception room 120 comprises a first inner surface 123 and a second inner surface 124 opposite the first inner surface 123.

Figure 5:
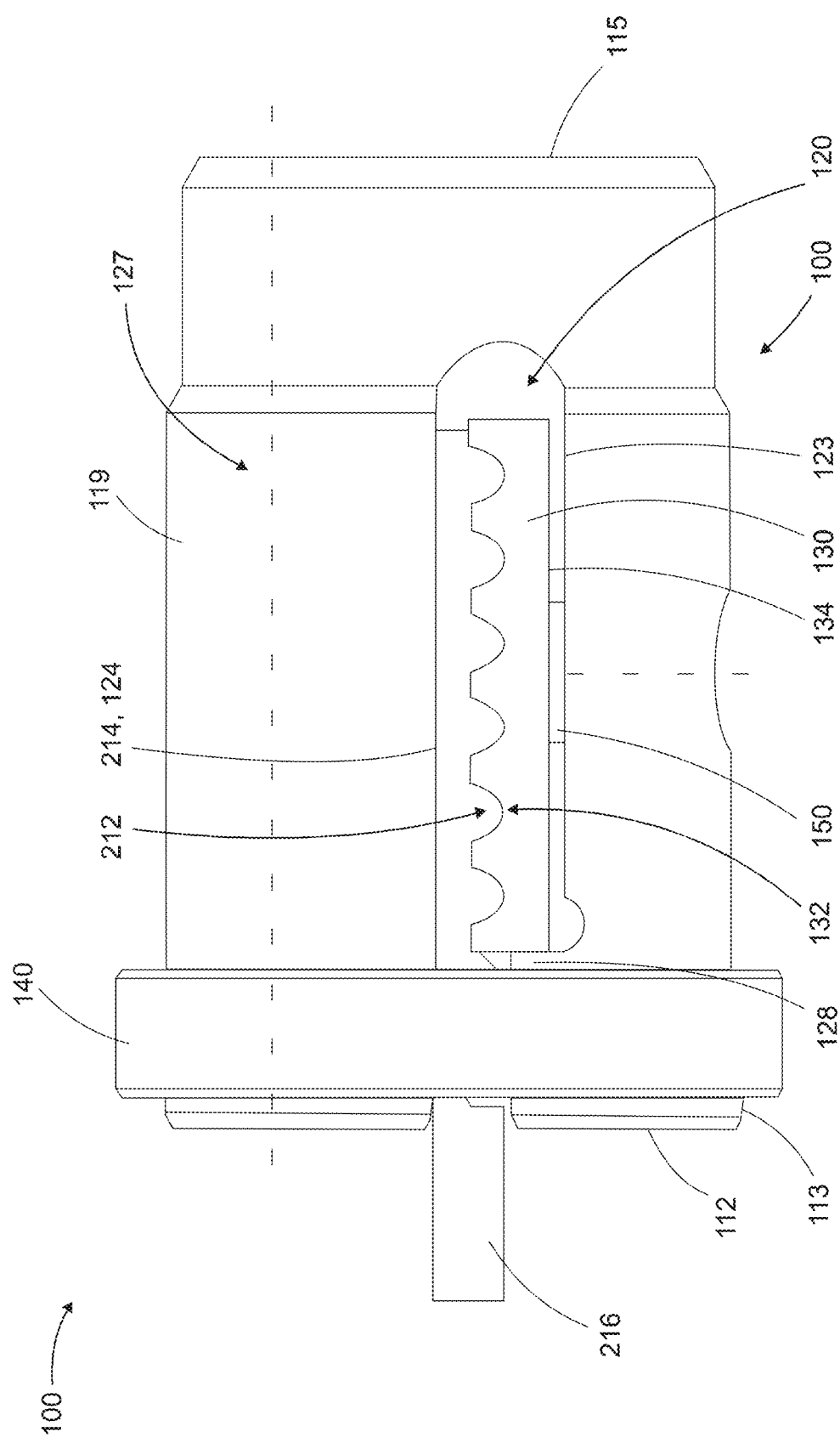

The pressure plate 130 comprises a pressure plate upper side 132 with a toothing and a pressure plate lower side 134, wherein the toothed belt 210 (see FIGS. 3 and 5) further comprises a toothed belt inner side 212 with a toothing (cf. FIG. 5), and a toothed belt outer side 214 (cf. FIG. 5). The toothing of the pressure plate upper side 132 is configured complementary to the toothing of the toothed belt inner side 212.

A first, annularly configured stop 113, which is arranged between the front side 112 and the support portion 129, projects radially outwards from the outer circumferential surface 119 of the clamping body 110.

A second stop 128, in particular adjacent to the front side 112, projects from the first inner surface 123 in the direction of the second inner surface 124. The second stop 128 is configured such that the end portion 216 received in the reception room 120 in combination with the pressure plate 130 is secured against slipping out along the motion axis 500 in the direction of the front side 112.

The pressure member 150 is configured as a grub screw.

Furthermore, a tensioning screw 400 is provided, which can be received in a through bore 127 of the clamping body 110 and can be screwed into a tensioning thread of the slide 300 in order to adjust the tension of the toothed belt 210. The clamping body 110 further comprises a guiding area 117, which is configured purely by way of example as a flat surface and is complementary to the guiding contour 324 of the first reception opening 312. When the clamping apparatus 100 is received in the first reception opening 312, the planar surface of the guiding area 117 is oriented in such a way that a surface normal of the planar surface extends transversely to the motion axis 500. In FIG. 4, purely by way of example, the planar surface of the guiding area 117 is also aligned parallel to the upper surface 304 of the carrier body 302. What has been explained with regard to the orientation of the planar surface of the guiding area 117 applies analogously to the orientation of the guiding contour 324. Furthermore, the guiding area 117 and the guiding contour 324 can also be configured to be serrated or curved. In this way, positive locking between the clamping body 110 and the first reception opening 312 ensures a clear rotational alignment of the clamping body 110 with respect to the first reception opening 312 and thus with respect to the slide 300. Furthermore, this ensures an anti-rotation lock for the end portion 216 of the toothed belt 130 received on the clamping body 110.

FIG. 5 shows an abstract representation of the clamping apparatus 100 with the support body 140 surrounding the support portion 129. Accordingly, the support body 140 is in the functional position. In the configuration shown in FIG. 5, the pressure plate 130 and the end portion 216 are received in the reception room 120 such that the toothed belt outer side 214 faces the second inner surface 124, the pressure plate lower side 134 faces the first inner surface 123 and the toothed belt inner side 212 faces the pressure plate upper side 132. With the pressure member 150 resting on the pressure plate lower side 134, the pressure plate 130 is pressed against the toothed belt 210, whereby the toothed belt outer side 214 is pressed against the second inner surface 124. In the process, the support body 140 surrounding the support portion 129 prevents the reception room 120 from widening, in particular caused by the pressure member 150. The back side 115 comprises a chamfer, which can simplify the mounting of the support body 140 on the clamping body 110 and the insertion of the clamping apparatus 100 into the first reception opening 312.

FIG. 6 shows the clamping apparatus 100 shown in FIG. 5 with the support body 140 positioned next to the clamping body 110. The support body 140 comprises an inner diameter D3 which is as large as an outer circumferential surface D1 of the support portion 129. The outer circumferential surface 119 comprises an outer diameter D2 which is smaller than the inner diameter D3 and the outer diameter D1. The first stop 113 comprises an outer diameter D4 that is larger than the inner diameter D3. In this way, the support body 140 can be prevented from slipping along the motion axis 500 in the direction of the front side 112.

The invention claimed is:

1. A toothed belt axis comprising a toothed belt, a toothed belt disk, a deflector, a profile body extending along a motion axis, a slide and a clamping apparatus, wherein the slide comprises a first front surface, into which first front surface a first reception opening extending along the motion axis for receiving the clamping apparatus is inserted, wherein the profile body is configured for linearly movable guidance of the slide, wherein the toothed belt can be driven by means of the toothed belt disk and can be deflected by means of the deflector, the slide being movable in the profile body by means of the toothed belt, the clamping apparatus comprising a clamping body, a pressure plate, an annularly configured support body and a pressure member, the clamping body having a front side a back side, a reception room configured as a slot and a support portion, wherein the reception room extends from the front side along the motion axis and passes through the clamping body transversely to the motion axis, wherein the reception room comprises a first inner surface and a second inner surface opposite the first inner surface, wherein the pressure plate comprises a pressure plate upper side with toothing and a pressure plate lower side, wherein the toothed belt comprises a toothed belt inner side with toothing, a toothed belt outer side and at least one end portion, wherein the pressure plate and the end portion are received in the reception room in such a way that the toothed belt outer side faces the second inner surface, the pressure plate lower side faces the first inner surface and the toothed belt inner side faces the pressure plate upper side, wherein the toothing of the pressure plate upper side is configured complementary to the toothing of the toothed belt inner side, wherein the pressure plate is pressed against the toothed belt by the pressure member resting on the pressure plate lower side in order to press the toothed belt outer side against the second inner surface, wherein the support body surrounds the support portion in order to prevent the reception room from widening.

2. The toothed belt axis according to claim 1, wherein the clamping body comprises an outer circumferential surface, from which outer circumferential surface a first stop projects outwards in the radial direction and is positioned between the front side and the support portion.

3. The toothed belt axis according to claim 1, wherein a second stop projects from the first inner surface in the direction of the second inner surface.

4. The toothed belt axis according claim 1, wherein the toothed belt axis further comprises a tensioning screw, wherein the clamping body further comprises a through bore extending from the front side to the back side for receiving the tensioning screw and the slide further comprises a tensioning thread which extends from the first reception opening along the motion axis, wherein the tensioning screw can be screwed into the tensioning thread in order to adjust the tension of the toothed belt.

5. The toothed belt axis according to claim 1, wherein the first reception opening comprises a guiding contour and the clamping body comprises a guiding area which is complementary to the guiding contour.

6. The toothed belt axis according to claim 1, wherein the clamping body is made of a light metal.

7. The toothed belt axis according to claim 1, wherein the support portion comprises a larger outer diameter than the remaining outer circumferential surface.

8. The toothed belt axis according to claim 1, wherein the outer diameter of the support portion and the inner diameter of the support body have the same size.

9. The toothed belt axis according to claim 1, wherein the clamping body is configured to be rotationally symmetrical at least in certain sections.

10. The toothed belt axis according to claim 1, wherein the toothed belt axis further comprises a further clamping apparatus, wherein the slide further comprises a further front surface into which further front surface a second reception opening positioned opposite the first reception opening is inserted for receiving the further clamping apparatus, wherein the toothed belt comprises a further end portion which further end portion is received in the reception room of the further clamping apparatus.

11. The toothed belt axis according to claim 3, wherein the second stop is positioned adjacent to the front side.

12. The toothed belt axis according to claim 6, wherein the clamping body is made of aluminum.

\* \* \* \* \*